May 13, 1969 L. FEIGIN 3,444,552
FUSED CHARACTER DIGITAL READOUT DEVICE HAVING
HALF OF EACH CHARACTER COMMON WITH
ANOTHER CHARACTER
Filed Oct. 18, 1965 Sheet 1 of 3
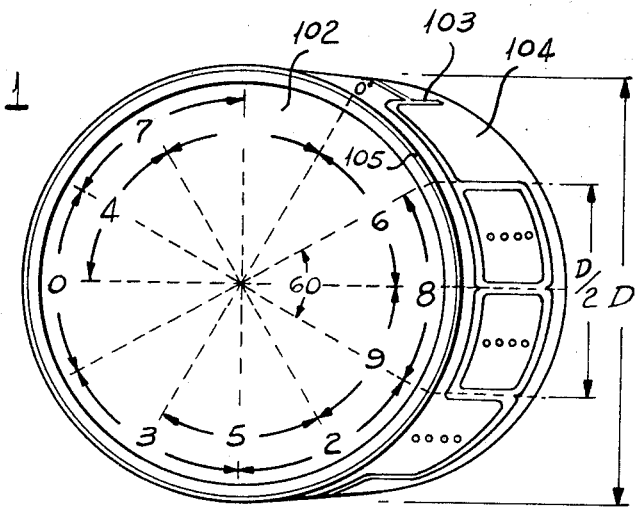
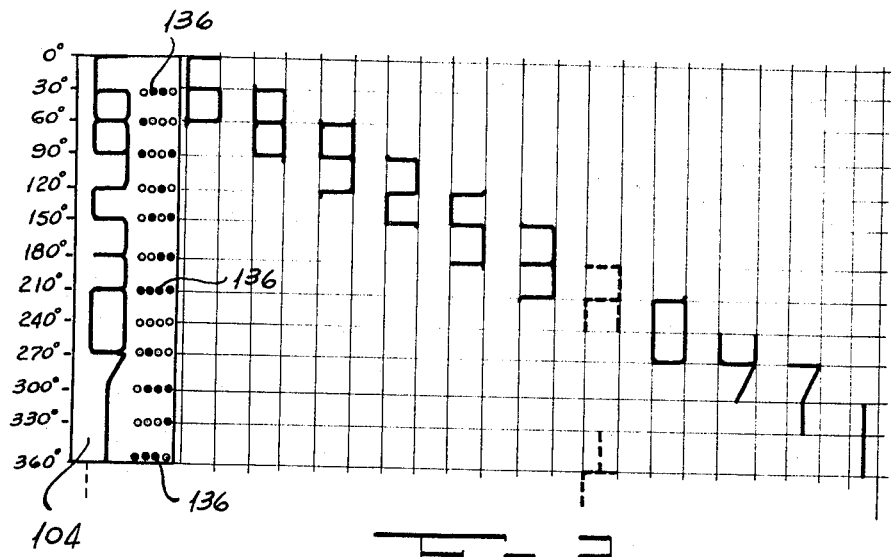
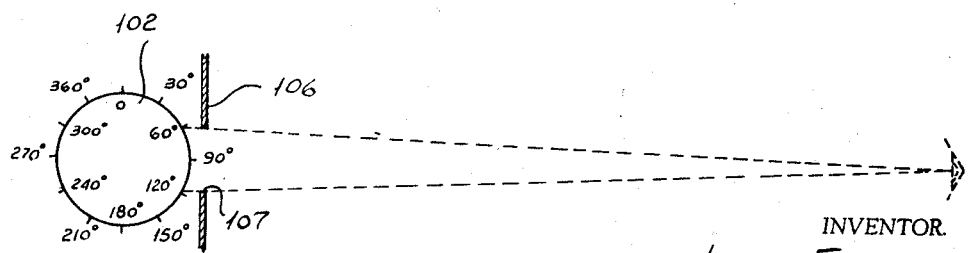
INVENTOR.
LEON FEIGIN
BY
Shenier & O'Connor
ATTORNEYS

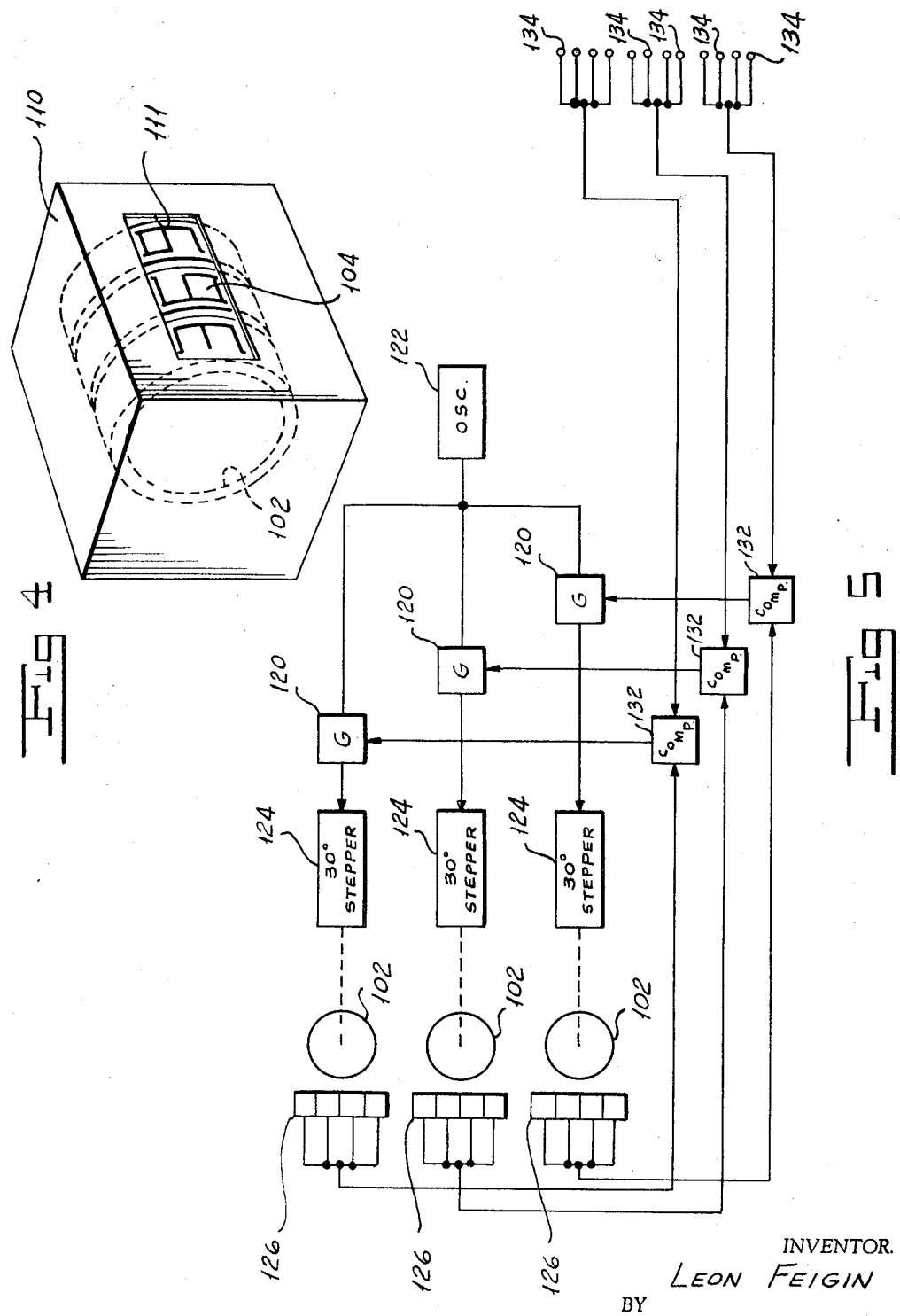

May 13, 1969
L. FEIGIN
3,444,552
FUSED CHARACTER DIGITAL READOUT DEVICE HAVING
HALF OF EACH CHARACTER COMMON WITH
ANOTHER CHARACTER
Filed Oct. 18, 1965
Sheet 3 of 3
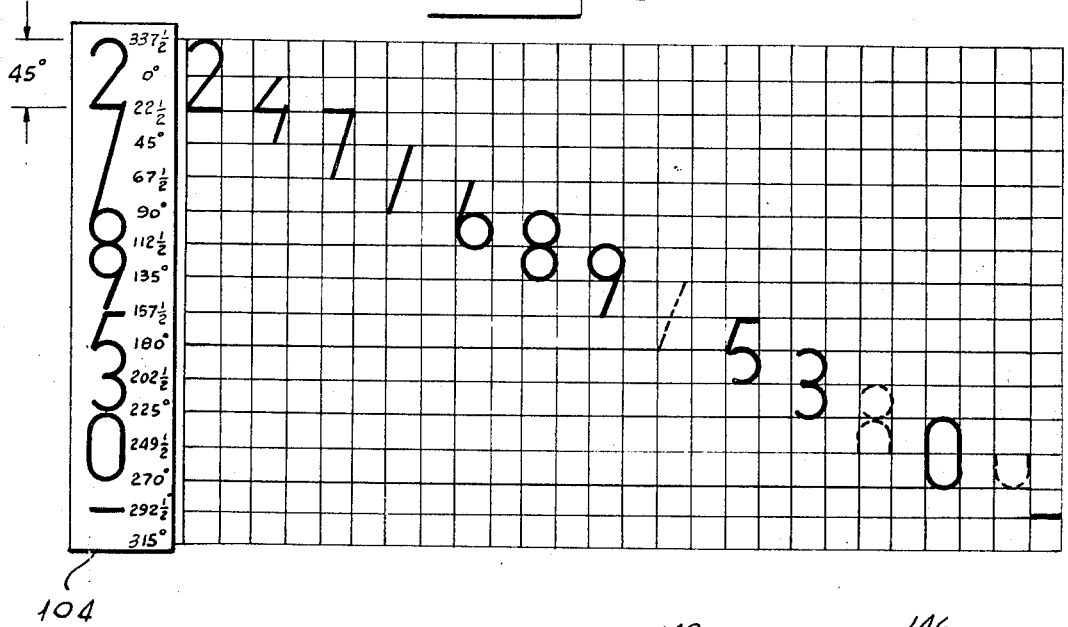
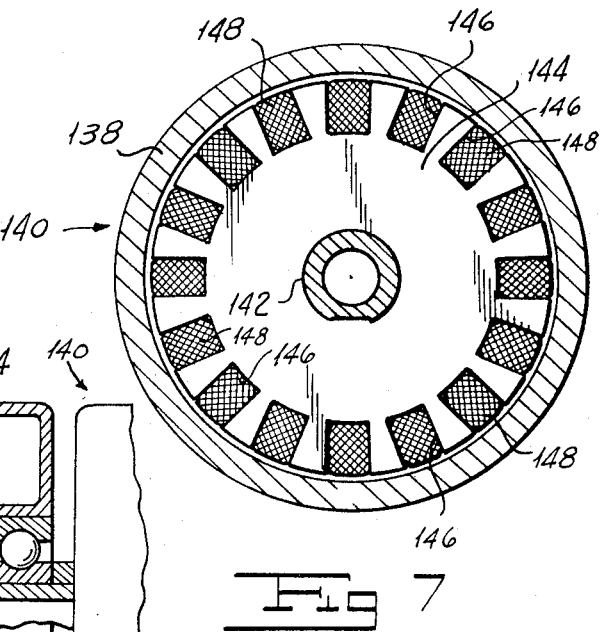
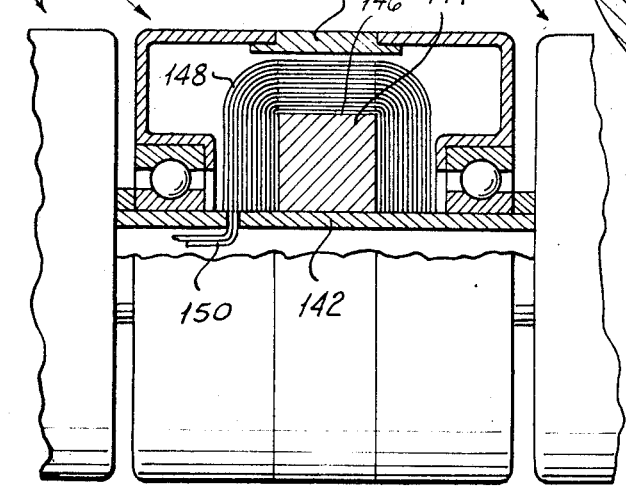
INVENTOR.
LEON FEIGIN
BY
Shenier & O'Connor
ATTORNEYS

United States Patent Office 3,444,552
Patented May 13, 1969

3,444,552
FUSED CHARACTER DIGITAL READOUT DEVICE HAVING HALF OF EACH CHARACTER COMMON WITH ANOTHER CHARACTER
Leon Feigin, Westport, Conn., assignor to United Aircraft Corporation, East Hartford, Conn., a corporation of Delaware
Filed Oct. 18, 1965, Ser. No. 496,979
Int. Cl. G08b 5/14
U.S. Cl. 340—379                               14 Claims

ABSTRACT OF THE DISCLOSURE

A display device for characters arranged in a scrambled pattern on a circular surface is disclosed. Identical upper and lower halves of adjacent characters are overlapping and the centers of the respective characters are positioned at locations on the surface corresponding to an integral multiple of a certain angle. This permits the surface to be stepped in equal increments to shift from a display of one character to a display of the adjacent character.

---

My invention relates to the art of displaying information, and more particularly to a compact digital readout device for displaying arabic numerals.

There are many installations such, for example, as the cockpit of an aircraft in which digital decimal information must be displayed and in which space is at a premium. Owing to this latter fact one of the most important considerations in providing the display is that the apparatus be compact. Attempts have been made in the prior art to provide compact information displays for arabic numerals wherein a plurality of segments arranged in the pattern of a FIGURE 8 are selectively illuminated to make up the various numerals. These displays of the prior art are expensive and require relatively complicated associated circuitry. They suffer from the further defect that they are difficult to read under conditions of high ambient illumination such as sunlight.

As an alternative to the selectively illuminated segments it has been proposed in the prior art that printed displays in the form of tapes or the like carrying the individual digits be arranged to be stepped to provide the display.

I have invented apparatus for individually displaying arabic numerals which not only is compact but which is extremely simple, reliable and inexpensive for the result achieved thereby.

One object of my invention is to provide an informational display device which is compact, simple, rugged and reliable.

Another object of my invention is to provide apparatus for individually displaying arabic numerals in which the size of the numeral displayed is large as compared with the overall size of the apparatus.

A further object of my invention is to provide apparatus for displaying characters in which the surface carrying the characters may be stepped in equal increments selectively to display the characters.

Still another object of my invention is to provide apparatus for displaying characters in which the character carrying surface has indicia providing a position signal which can be compared with an input signal to insure that the surface is correctly positioned to display the correct character.

A still further object of my invention is to provide apparatus for displaying characters in which the characters are readily discernible even under high ambient light.

Other and further objects of my invention will appear from the following description:

In general my invention contemplates the provision of a display device for characters arranged in a scrambled pattern on a circular surface with identical upper and lower halves of adjacent characters overlapping in such manner that the surface can be stepped in equal increments behind a window corresponding to the height of a single character selectively to display the characters. I may form the characters by use of an opaque mask on a translucent drum. I provide the surface with indicia adapted to be sensed to afford an indication of drum position. In one form of my invention the surface is stepped in 30° increments, and in another form of my invention the surface is stepped in 22½° increments.

In the accompanying drawings which form part of the instant specification and which are to be read in conjunction therewith and in which like reference numerals are used to indicate like parts in the various views:

FIGURE 1 is a perspective view of a drum carrying one form of my scrambled overlapping numeral pattern on its circumferential surface;

FIGURE 2 is a developed view of the surface of a drum shown in FIGURE 1 illustrating the details of one form of my pattern for displaying the arabic numerals from 0 to 9;

FIGURE 3 is a schematic view of the relationship between a drum and an apertured plate for limiting the region of the drum's surface visible to an observer;

FIGURE 4 is a perspective view of an embodiment of my digital readout device; and FIGURE 5 is a block diagram of a suitable circuit for positioning my new display apparatus in response to an input signal.

FIGURE 6 is a developed view illustrating the details of an alternate form of my pattern for displaying the arabic numerals from 0 to 9 and symbols.

FIGURE 7 is an elevation of an inside out stepper motor arrangement for selectively displaying the characters of my pattern.

FIGURE 8 is a sectional view of the arrangement shown in FIGURE 7 taken along the line 8—8 of FIGURE 7.

More particularly, referring now to FIGURES 1 to 4 of the drawings, on the circumferential surface 104 of a drum 102 I form a pattern 103 of lines such as that shown in FIGURE 2, which, as will be explained hereinafter, comprises the decimal digits from 0 to 9 inclusive. The drum 102 can be formed of plastic or metal or any other suitable material. Advantageously, I form the pattern by coating the surface of a translucent drum with an opaque film 105 and then removing portions of the opaque coating in the desired pattern 103 by means of a scribe or the like. The resulting translucent pattern not only is readily visible in high ambient light but also it can conveniently be illuminated from within the drum or by edge lighting to make it visible under conditions of low ambient light. It will be understood, moreover, that any suitable combination of background color and pattern color, such as black and white for example, can be used in the practice of my invention and any suitable method known in the art can be used for forming the pattern.

It will readily be apparent that the chord of the 60° sector covered by one numeral is half the length of the drum diameter. Thus, the height of each digit which is displayed by the pattern 103 is approximately equal to one half the diameter of drum 102. For example, digits ¼ inch high can be displayed by a drum ½ inch in diameter.

With the pattern shown in FIGURE 2 the decimal digits formed by the lines are scrambled around the circumference of the drum. Moreover, each decimal digit formed by the pattern comprises half of at least one adjacent digit. This arrangement is made possible by the fact that certain arabic numerals have portions of similar configuration. Specifically in the arrangement shown, the lower half of the digit 6 and the upper half of the digit 8 are formed from the same lines; the lower half of the digit 8 and the upper half of the digit 9 are formed from the same lines; the lower half of the digit 9 and the upper half of the digit 2 are formed from the same lines; the lower half of the digit 2 and the upper half of the digit 5 are formed from the same lines; and the lower half of the digit 5 and the upper half of the digit 3 are formed from the same lines. The lower half of the digit 3 is not common to any other digit. The lower half of the 0 and the upper half of the digit 4 are formed from the same lines. The lower half of the digit 4 and the upper half of the digit 7 are formed from the same lines; and the lower half of the digit 7 and the upper half of the digit 1 are formed from the same lines. The lower half of the digit 1 is not common to any other digit.

I present a discrete picture of an individual numeral to an observer by mounting a plate 106 having a window 107 in front of drum 102. Window 107 limits the view of the surface of drum 102 to the height of a single digit. The size of the opening 107 required depends on the distance between the plate 106 and the drum 102. Preferably the distance is about 1/16 inch, in which case an opening 107 approximately equal to the height of a single digit is satisfactory.

In the specific embodiment of my apparatus shown in FIGURE 4 I mount a number of drums 102 in side-by-side relationship in a housing 110 provided with a window 111 extending across the housing.

Although complex lens systems might be used to limit the field of view on the surface of the drums, simply providing suitable opening 111 in the housing 110 is generally satisfactory. When the drums 102 are properly positioned to be read, an observer viewing the surfaces 104 through opening 111 sees a number made up of a plurality of numerals on the respective drums.

Referring to FIGURE 5 I have shown one embodiment of a suitable closed loop, position sensitive system of a type which may be used for positioning drums 102.

In that system gating circuits 120 may be actuated to couple the output of an oscillator 122 to twelve-position steppers 124 to drive the drums 102. Sensors 126 detect the positions of drums 102. I apply the outputs of sensors 126, which represent the angular positions of drums 102, to respective first inputs of respective comparator circuits 132, the other inputs of which are applied at groups of terminals 134, and the outputs of which are coupled to gate circuits 120. Conveniently each sensor 126 produces an output in binary coded decimal form representative of the digit or numeral presently displayed by the associated drums 102. The inputs at the various groups of terminals 134 are likewise in binary coded decimal form and represent the numerals it is desired to display on the respective drums 102. Each comparator 132 compares the output of each sensor 126 with the input at the corresponding group of terminals 134 to provide a difference signal for each digit of the display. The difference signal actuates the corresponding gate 120 to couple the output pulses from oscillator 122, which may be a bi-stable multivibrator circuit for example, to stepper 124, which advances drum 102 through 30° for each input pulse received. Any suitable mechanism known to the art, such as a solenoid and ratchet or a stepper motor adapted to rotate the drum 102 in 30° steps may be used. It will be understood that drum 102 is initially aligned with opening 107 so that a discrete digit is displayed. Thereafter each 30° rotation of the drum causes another discrete digit to be displayed. The two unused portions of the pattern—the lower half of the digit 3 and the lower half of the digit 1—can be used for checking the operation of the apparatus.

It is to be noted that the centers of my characters are spaced around the drum at positions which are integral multiples of 30°. Owing to this arrangement the drum can be stepped around in equal steps selectively to display the characters. Thus, complicated arrangements involving unequal steps of position are avoided.

Sensors 126 may be of any suitable type known to the art. Both contacting and non-contacting angular position sensors are satisfactory although the latter type is preferable. For example, a photoelectric reading head can be used in conjunction with a binary pattern of light reflective and light absorbtive spots 136 placed on the surface of drum 102, as shown in FIGURE 2. The spots may be illuminated by a suitable lamp (not shown). The binary patterns 136 on drum 102 may be displaced any desired distance such as 180° from the digits to which they respectively correspond so that the sensor 126 can be positioned at the rear of the drum away from the viewing area. With the closed, position-sensitive system just described the fact that the digits on the drum are not sequential is of no importance. If desired the digital readout devices which employ my invention may include, for example, circuitry that ensures that the drum rotates through the shortest distance to each new position.

Referring to FIGURE 6, I have shown an alternate arrangement of characters on a support such, for example, as the surface 104. In that particular arrangement, the arabic numerals 2, 4, 7, 1, 6, 8 and 9 are arranged with half of each of the numerals comprising half of an adjacent numeral. With this arrangement following the 9 there is an indistinguishable character as is indicated in broken lines and then overlapping characters 5 and 3, then an indistinguishable character, then 0, then an indistinguishable character, following which I provide a bar and a blank. It will readily be appreciated that with this alternative arrangement, where the characters are arranged on a cylindrical surface, each character subtends an angle of 45°. Moreover, the drum rather than being stepped in 30° steps is stepped in 22½° steps. This form of my invention, however, retains the salient feature which is equal steps of the surface carrying the characters.

Owing to the fact that the surface on which the characters are formed may be stepped in equal increments, I am to form the characters on the rotatable outer shell 138 of an inside out stepper motor indicated generally by the reference character 140. Motor 140 includes a hollow stationary shaft 142 which supports a stack of laminations 144 formed with slots 146 for receiving windings. In the particular form of stepper motor illustrated in FIGURES 7 and 8, I employ eight windings 148 so arranged that their axes are generally perpendicular to the axis of the shaft 142. The outer shell 138 is permanently magnetized to provide a north pole disposed at one end of a diameter and a diametrically opposite south pole. When any one of the 8 windings is energized with direct current, it produces a field which constrains the shell 138 to move to a position at which its field is aligned with the winding field. By selectively energizing the windings with voltages of opposite polarities, I provide 16 different positions of the shell 138. Thus, if the sequence of characters shown in FIGURE 6 is applied to the outer surface of the shell 138, the selective energization of the winding can position any selective character so as to be visible as behind a viewing window 107. It will be appreciated, however, that when the pattern shown in FIGURE 6 is employed the window 107 resistricts the view to the extent of only a single character.

The windings 148 may, for example, be energized by conductors 150 extending into the hollow shaft. Moreover, a number of motors 140 may be positioned adjacent each other along the shaft to provide a multidigit readout. Any suitable logic circuitry responsive to coded input signals may be used to actuate stepper motor 140. By way of example, if I wish to display the numeral 4 located at the 22½° position, as indicated in FIGURE 6, I energize that winding disposed generally in the plane of the line passing through the 112½° and 292½° positions with current of one polarity. To display the diametrically oppositely disposed numeral 3, I energize the same winding but with current of the opposite polarity. In a similar manner, all other characters may similarly be displayed.

In operation of my display apparatus, information in the form of binary coded decimal digital information representing the decimal number to be displayed may be applied to the comparator terminals 134. Sensor 126 which reads the information from the respective drums 102 prvides the second input to the comparator. The comparator 132 in turn produces an output representing the difference between what is read by the sensor 126 and the information present at terminal 134 to actuate the gate 120 to permit oscillator pulses to be fed to the steppers 124, for example, to step the drums 102 until the outputs of sensors 126 correspond to the inputs at terminal 134. When this has been achieved the observer looking through the opening 111 will see a decimal representation of the input at terminal 134 as a plurality of arabic numerals. For example, the left-hand drum 102 shows a 3 which includes the lower half of a 5; the center drum 102 shows a 6, the lower half of which corresponds to the upper half of an 8; and the right-hand drum 102 shows the numeral 8, the upper half of which corresponds to the lower half of a 6, and the lower half of which corresponds to the upper half of a 9. It will be appreciated that the size of each of the numerals visible through the window 111 is approximately half the diameter of the drum 102. When the input at terminal 134 changes, the drums 102 are stepped to new positions to provide a display of the decimal number represented by the information at terminal 134. The arrangement of FIGURES 6 to 8 operates in a similar manner. Rather than being stepped in 30° increments, as is surface 104 in the form of the apparatus of FIGURES 1 to 4, the surface is stepped in 22½° increments by motors 140.

It will be seen that I have accomplished the objects of my invention. I have provided a novel compact digital display device which is simple and reliable. I have provided a printed display of the alphanumeric characters such as arabic numerals 0 to 9 inclusive. The characters of my display are readily distinguishable even under conditions of high ambient light. Owing to the fact that the centers of the characters are spaced by integral multiples of 30° or of 22½°, my drum can be stepped in equal increments by means of a simple drive mechanism. The closed loop positioning system ensures that the selected character is displayed.

Having thus described my invention, what I claim is:

1. In a device for selectively displaying the arabic numerals from 0 to 9, pairs of said numerals having halves of similar configuration, means providing a viewing surface, and means forming a pattern of said numerals on said surface with said salves overlaping, the order of said numerals on said surface being 0, 4, 7, 1, 6, 8, 9, 2, 5, 3.

2. In a device for selectively displaying the arabic numerals from 0 to 9, pairs of said numerals having halves of similar configuration, means providing a viewing surface, and means forming a pattern of said numerals on said surface with said halves overlapping, the order of said numerals being 0, 2, 4, 7, 1, 6, 8, 9, 5, 3.

3. In a device for selectively displaying the arabic numerals from 0 to 9, pairs of said numerals having halves of similar configuration, means providing a viewing surface, and means forming a pattern of said numerals on said surface with said halves overlapping the order of said numerals on said surface being 0, 2, 4, 7, 1, 6, 8, 9, 5, 3, and wherein the lower half of the numeral 2 comprises the upper half of the numeral 4, the lower half of the numeral 4 comprising the upper half of the numeral 7, the lower half of the numeral 7 comprising the upper half of the numeral 1, the lower half of the numeral 1 comprising the upper half of the numeral 6, the lower half of the numeral 6 comprising the upper half of the numeral 8, the lower half of the numeral 8 comprising the upper half of the numeral 9 and the lower half of the numeral 5 comprising the upper half of the numeral 3.

4. In a device for selectively displaying the arabic numerals from 0 to 9, pairs of said numerals having halves of similar configurations, means providing a viewing surface, and means forming a pattern of said numerals on said surface with said halves overlapping, the order of said numerals on said surface being 0, 4, 7, 1, 6, 8, 9, 2, 5, 3, and wherein the upper half of the numeral 8 comprises, the lower half of the numeral 6; the lower half of the numeral 8 comprises the upper half of the numeral 9; the upper half of the numeral 2 comprises the lower half of the numeral 9; the lower half of the numeral 2 comprises the upper half of the numeral 5; the lower half of the numeral 5 comprises the upper half of the numeral 3; the lower half of the numeral 0 comprises the upper half of the numeral 4; the lower half of the numeral 4 comprises the upper half of the numeral 7; and the lower half of the numeral 7 comprises the upper half of the numeral 1.

5. In a device for selectively displaying a plurality of characters, pairs of which have halves of similar configuration, a drum of translucent material providing a viewing surface, and opaque material on said surface forming a pattern of said characters on said surface with said halves overlapping.

6. A system for selectively displaying a plurality of visibly intelligible characters in response to coded signals corresponding to said characters, pairs of said characters having halves of similar configuration, means providing a viewing surface, means forming a pattern of said characters on said surface with said halves overlapping, a window adjacent said surface providing means, said window limiting the view of said surface to the extent of a single character, means for driving said surface providing means, sensible coded indicia on said surface, said indicia corresponding to said characters, means for sensing said indicia, a source of input coded signals and means responsive to said source and to said sensing means for actuating said drive means.

7. An assembly for selectively displaying a plurality of characters, pairs of which have halves of similar configuration including in combination, means providing a viewing surface, and means forming a generally circular pattern of said characters on said surface with said halves overlapping and with the center of each character positioned on said surface at a position corresponding to an integral multiple of 30°.

8. An assembly as in claim 7 in which each of said characters subtends an angle of approximately 60°.

9. Apparatus for selectively displaying a plurality of characters, pairs of which have halves of similar configuration including in combination, means providing a viewing surface, and means forming a generally circular pattern of said characters on said surface with said halves overlapping and with the center of each character positioned at a location on said surface corresponding to an integral multiple of 22½°.

10. Apparatus as in claim 9 in which each character subtends an angle of approximately 45°.

11. Apparatus for selectively displaying a plurality of characters, pairs of which have halves of similar configuration including in combination, a stationary shaft, a cylindrical magnet, means mounting said magnet for rotary movement on said shaft, said magnet providing a circumferential viewing surface, means forming a pattern of said characters on said surface with said halves overlapping and a plurality of selectively energizable windings on said shaft and adapted to be energized selectively to position said magnet.

12. Apparatus for selectively displaying a plurality of characters, pairs of which have halves of similar configuration, including in combination, means providing a viewing surface, and means forming a generally circular pattern of said characters on said surface with said halves overlapping and with the center of each character positioned at a location on said surface corresponding to an integral multiple of a certain angle.

13. Apparatus as in claim 12 in which each character subtends an angle equal to approximately twice said certain angle.

14. Apparatus as in claim 12 including means for stepping said surface providing means in steps approximately equal to said certain angle.

References Cited

UNITED STATES PATENTS 2,748,382  5/1956  Hults _____ 340—379 X
3,200,396  8/1965  Stevens _____ 340—378

JOHN W. CALDWELL, *Primary Examiner.*

H. I. PITTS, *Assistant Examiner.*

U.S. Cl. X.R.

340—378